(12) United States Patent
Kumar et al.

(10) Patent No.: US 12,499,890 B2
(45) Date of Patent: Dec. 16, 2025

(54) METHOD AND SYSTEM FOR DYNAMIC IVR PROMPT GENERATION VIA PRIOR CONTEXTUAL LANGUAGE ANALYSIS

(71) Applicant: Verizon Patent and Licensing Inc., Basking Ridge, NJ (US)

(72) Inventors: Durgesh Kumar, Bangalore (IN); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 376 days.

(21) Appl. No.: 18/319,729

(22) Filed: May 18, 2023

(65) Prior Publication Data

US 2024/0386887 A1 Nov. 21, 2024

(51) Int. Cl.
| | |
|---|---|
| G06F 40/30 | (2020.01) |
| G10L 13/02 | (2013.01) |
| G10L 15/02 | (2006.01) |
| G10L 15/06 | (2013.01) |
| G10L 15/18 | (2013.01) |
| G10L 15/183 | (2013.01) |
| G10L 15/22 | (2006.01) |
| G10L 25/63 | (2013.01) |

(52) U.S. Cl.
CPC .............. *G10L 15/22* (2013.01); *G10L 13/02* (2013.01); *G10L 15/02* (2013.01); *G10L 15/063* (2013.01); *G10L 15/1815* (2013.01); *G10L 15/183* (2013.01); *G10L 25/63* (2013.01)

(58) Field of Classification Search
CPC ..... G06F 40/30; G06F 2218/08; G10L 15/26; G10L 15/22; G10L 13/02; G10L 13/027; G10L 15/02; G10L 15/063; G10L 15/1815; G10L 15/183; G10L 25/63; G10L 17/22; H04M 3/493
See application file for complete search history.

(56) References Cited

U.S. PATENT DOCUMENTS

| | | | | |
|---|---|---|---|---|
| 7,515,695 | B1* | 4/2009 | Chan | H04M 3/493 709/227 |
| 12,020,690 | B1* | 6/2024 | Gamzu | G06N 3/045 |
| 12,020,960 | B2* | 6/2024 | Smith | H01L 21/68771 |
| 2003/0083882 | A1* | 5/2003 | Schemers, III | H04M 3/4938 704/270.1 |
| 2006/0149558 | A1* | 7/2006 | Kahn | G10L 15/063 704/278 |
| 2007/0047719 | A1* | 3/2007 | Dhawan | G06F 3/167 379/235 |
| 2010/0158205 | A1* | 6/2010 | Dhawan | H04M 1/2478 379/88.01 |
| 2011/0286584 | A1* | 11/2011 | Angel | H04M 3/42221 379/88.02 |

(Continued)

*Primary Examiner* — Jakieda R Jackson

(57) ABSTRACT

The present teaching relates to personalized IVR communications with a customer at a geo-locale. A first set of transcripts of the current and historic communications involving the customer and a second set of transcripts of historic communications associated with the geo-locale are analyzed to compute a personalized contextual vector, a geo-localized contextual vector, and a current text vector. The computed vectors are used by a language model to generate a personalized and geo-locale aware prompt, which is used to generate an IVR communication and is sent to the customer as a response.

18 Claims, 13 Drawing Sheets

(56) References Cited

U.S. PATENT DOCUMENTS

| | | | | |
|---|---|---|---|---|
| 2020/0111482 | A1* | 4/2020 | Chae | G06N 3/042 |
| 2022/0199088 | A1* | 6/2022 | Goldstein | G10L 15/26 |
| 2022/0345571 | A1* | 10/2022 | Chau | H04M 3/5166 |
| 2023/0281691 | A1* | 9/2023 | Buzzell | G06Q 30/0641 |
| | | | | 705/26.7 |
| 2024/0127818 | A1* | 4/2024 | Attwater | G10L 15/26 |
| 2024/0303431 | A1* | 9/2024 | Annadi | G06F 40/40 |

\* cited by examiner

METHOD AND SYSTEM FOR DYNAMIC IVR PROMPT GENERATION VIA PRIOR CONTEXTUAL LANGUAGE ANALYSIS

BACKGROUND

Customer service provides an opportunity for a company to organizations to address customer concerns and provide customers with support via various means of communication. A customer often conducts such communications with a service provider via an interactive voice responses (IVR) system, which is an automated telephone system that uses pre-recorded messages to communicate with a user via text-to-speech technology. The IVR system conveys pre-recorded messages in a sequence and a customer may ask questions and an IVR may address and provide answers or responses to address issues raised by the customers. In communicating with different customers, the IVR system uses the same pre-recorded messages in a pre-determined manner.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION OF EXAMPLE EMBODIMENTS

Figure 1A:
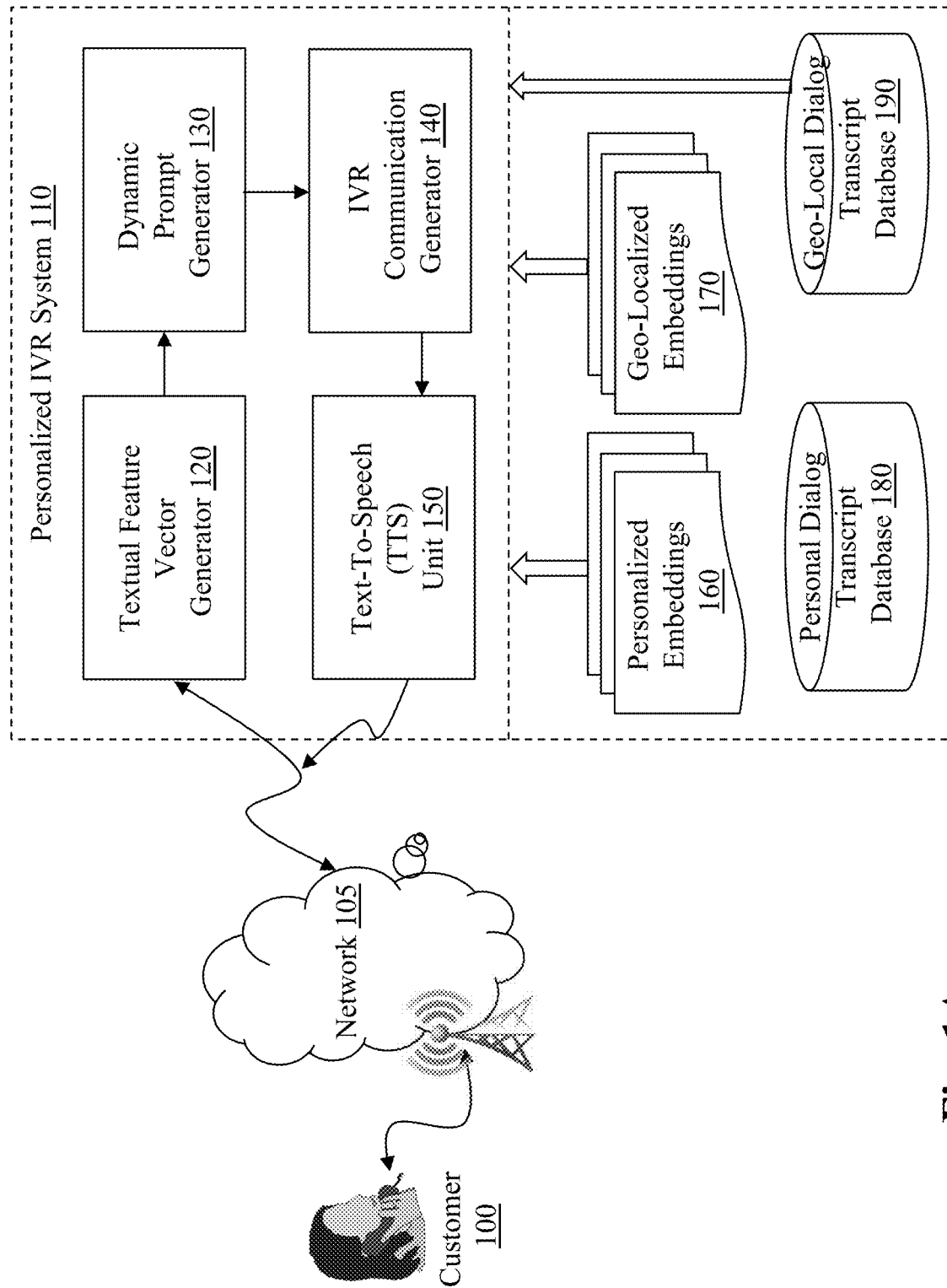
FIG. 1A depicts an exemplary high level system diagram of a personalized IVR system for personalized communication with customers, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching is directed to a personalized IVR communication framework to deliver improved services to customers via personalized communications. Traditional IVR systems operate by following a pre-determined conversation flow and text-to-speech technologies. A fixed script is provided to an IVR system and used to dictate the flow of a conversation. Regardless of the customer or the desired services, the traditional IVR system goes through the same scripts again and again in a pre-determined flow. Conducting a conversation in this fixed manner, forces each customer to follow a pre-determined flow making the communication tedious and unnecessarily time consuming. Lacking contextual awareness and/or knowledge associated with individual customers, a traditional IVR system is unable to adapt a communication with a customer to personalize the flow into a streamlined conversation.

The present teaching discloses a personalized IVR system capable of communicating with a customer in a personalized manner by generating prompts to steer the conversation in a particular direction based on knowledge learned about both the customer and his or her geographic location or region. A conversation flow may be intelligently controlled via such dynamically generated prompts. Insights about each customer may be characterized by analyzing prior communications and the contextual information associated therewith. Similarly, insights about geo-localized communication may be captured based on conversations that occurred previously at the geographic location (and possibly nearby locations) and surrounding contextual information. For example, if a customer of a wireless service company calls the company's service line at an airport, the call is often in regards to a request for activating international coverage for a particular destination. Such geo-localized contextual information may also be leveraged by the personalized IVR system in estimating an intent of the call from a customer and generating accordingly suitable prompts to direct the communication based on what is likely the interest/intent of the customer.

According to the present teaching, machine learning is applied to learn relevant features/characteristics and their relative importance from training data, which may include both customers' prior communications as well as communications associated with different geo-locales associated with customers at the time of the communications. To learn insights about a customer, transcripts of historic communications involving the customer may be collected and analyzed to detect intent of the customer at different linguistic levels including, e.g., a phrase level intent, a session level intent, as well as a state of emotion of the customer. In some situations, unanswered questions may also be detected (e.g., questions not resolved in a previous or current communication) which may be indicative of an intent of the customer. Such features detected from previous communications reveal insights about the customer and may be used to obtain a set of personalized embeddings via deep machine learning, that represent the knowledge learned from input feature vectors about the customer through the words, relationship among words, and semantics of the words and relationships. The trained embeddings may then be used for generating a personalized contextual vector based on content of a communication with the customer.

To learn insights of geo-locale related communications, transcripts of past conversations associated with each geo-locale may be collected and analyzed. In some embodiments, different features may be extracted from transcripts associated with each geo-locale, including, e.g., geo-locale based intent (e.g., to activate international coverage), emotional state exhibited (e.g., in a hurry), and number of events with respect to each detected intent. Features related to locale-dependent communications may then be used in training geo-localized embeddings, which may then be used to generate a geo-localized contextual vector for a geo-locale for a communication occurring at the geo-locale. Transcripts of prior communications as well as their corresponding personalized contextual vectors and geo-localized contextual vectors may be used to pretrain a language model or a transformer for generating appropriate prompts based on such input vectors constructed based on contextual information associated with a communication.

In operation, the personalized IVR system according to the present teaching communicates with a customer via prompts dynamically generated in a personalized manner based on transcripts of both historic and present communication as well as learned knowledge about the customer. In each round of communication, a personalized contextual vector is computed based on transcripts of historic and current communications in accordance with the personalized embeddings. With a known geo-locale of the customer, a geo-localized contextual vector is computed based on transcripts of prior communications at the geo-locale using the geo-localized embeddings. The personalized and geo-localized contextual vectors may then be combined to generate a prompt input vector, which is input to the pretrained language model to generate a prompt.

The input to the language model may optionally include a current text vector, which characterizes the transcript of an on-going communication based on different linguistic features included therein. This may be especially relevant input when there is any pending question in the ongoing communication so that a current text vector may be obtained based on transcript of the ongoing communication and used as an additional input to the language model. A question in an ongoing communication may be relevant because it may be indicative of an intent of the customer and, hence, may influence what will be the next prompt. When both the prompt input vector and the current text vector are input to the language model, the prompt generated by the language model is personalized (via the personalized contextual vector), geo-locale sensitive (via the geo-localized contextual vector), and pending question aware (via the current text vector).

In some embodiments, a prompt (generated by the language model in text form) may be delivered as voice. In this operational mode, the language model generated textual prompt is used to carry out text-to-speech conversion to generate the corresponding voice prompt. When the customer received the prompt, the customer may further respond, which triggers the personalized IVR system to generate the next prompt based on the updated transcript of the ongoing communication. Because a communication between the personalized IVR system and a customer is conducted based on dynamically generated prompts that are personalized and geo-locale aware, the IVR communications according to the present teaching improve the efficiency with enhanced customer experience and satisfaction.

FIG. 1A depicts an exemplary high level system diagram of a personalized IVR system 110 for personalized communication with customers, in accordance with an embodiment of the present teaching. In this illustrated embodiment, the personalized IVR system 110 includes a frontend portion and a backend portion. The frontend portion interfaces with a customer 100 via a network 105. The backend portion may provide relevant data collected from different sources and archived in different databases to provide the basis for deriving models and embeddings for the frontend portion to generate prompts during a communication with a customer.

The frontend portion may comprise a textual feature vector generator 120, a dynamic prompt generator 130, an IVR communication generator 140, and a text-to-speech (TTS) unit 150. Based on an on-going communication with customer 100 as well as archived transcripts of various prior communications with different customers, the textual feature vector generator 120 may obtain different textual feature vectors based on embeddings stored in the backend portion. Details about types of textual feature vectors and corresponding embeddings will be provided below. Such textual feature vectors may be used by the dynamic prompt generator 130 as basis to generate prompts personalized for the customer with respect to a geo-locale where the customer is. The personalized prompt is used by IVR communication generator 140 to generate communication content to be conveyed to customer 100. Based on the communication content in text form, the TTS unit 150 may then convert the text communication content into speech form and delivers, via network 105, the voice to customer 100.

The backend portion includes personalized embeddings 160, derived via machine learning based on transcripts archived in a personal dialog transcript database 180, and geo-localized embeddings 170, derived via machine learning based on transcripts archived in a geo-locale dialog transcript database 190. The personalized embeddings 160 include different sets of parameters and each set of such embedding parameters is associated with a customer, which is learned via training based on communications involving the customer (personal) and used (by the textual feature vector generator 120) to obtain texture feature vectors characterizing communications involving the customer. The geo-localized embeddings 170 include different sets of embedding parameters and each set of such embedding parameters is associated with a geo-locale (e.g., a local airport), which is derived based on communications with customers while they were present at the geo-locale and is used (by the textual feature vector generator 120) to obtain texture feature vectors characterizing communications occurred at the geo-locale.

The network 105 as illustrated in FIG. 1A may be a local area network (LAN), a wide area network (WAN), a public network, a private network, a proprietary network, a Public Telephone Switched Network (PSTN), the Internet, a wireless network, a virtual network, or any combination thereof. Such a network or any portions thereof may be a 4G network, a 5G network, or a combination thereof. The network 10 may also include various network access points, e.g., wired, or wireless access points such as base stations or Internet exchange points, through which a particular customer may connect to the network in order to provide and/or transmit information to a specific destination. The information communicated among customer 100 and the personalized IVR system 110 via the network 105 may be delivered as bitstreams which may be encoded in accordance with certain industrial standards, such as MPEG4 or H.26x, and the network may be configured to support the transport of such encoded data streams.

Figure 1B:
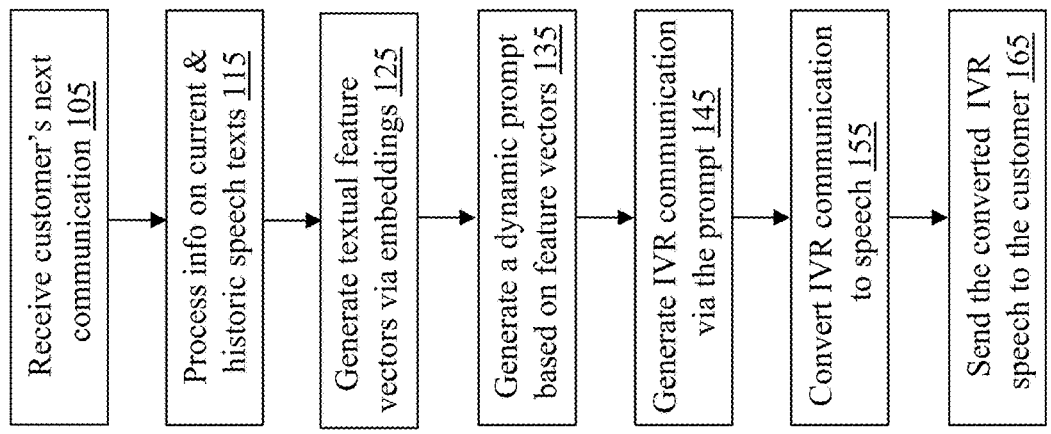
FIG. 1B is a flowchart of an exemplary process of a personalized IVR system for personalized communication with customers, in accordance with an embodiment of the present teaching.

FIG. 1B is a flowchart of an exemplary process of the personalized IVR system 110 for personalized communication with customers, in accordance with an embodiment of the present teaching. When the personalized IVR system 110 receives a customer's next communication at 105, it processes, at 115, information related to transcripts of both current and historic communications. The textual feature vector generator 120 generates, at 125, different textual feature vectors based on both historic and ongoing communication transcripts. The generated textual feature vectors are then used by dynamic prompt generator 130 to generate, at 135, a personalized prompt via a language model. To respond to the customer's communication, based on the generated dynamic prompt, the IVR communication generator 140 generates, at 145, IVR response communication in text form, which is then converted into a voice signal by the TTS unit 150 at 155 before the voice signal is sent to the customer 100 as a response at 165.

Figure 1C:
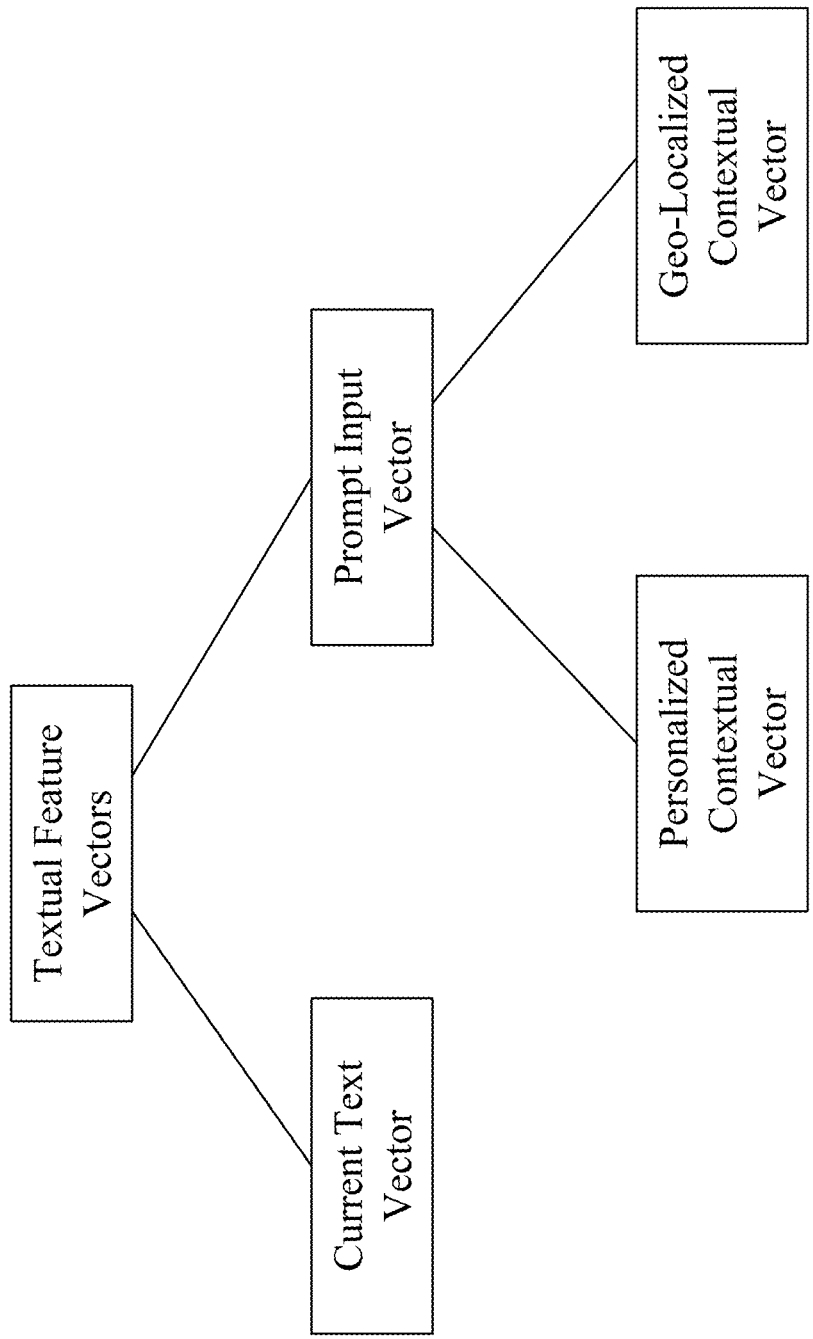
FIG. 1C illustrates exemplary types of textual feature vectors used in personalized IVR communication, in accordance with an embodiment of the present teaching.

As discussed herein, in order to generate a personalized prompt, various textual feature vectors may be generated based on transcripts of personal communications involving the customer as well as that of historic communications that occurred at a geo-locale where the customer 100 is located. FIG. 1C illustrates exemplary types of textual feature vectors used in personalized IVR communication, in accordance with an embodiment of the present teaching. In this illustration, textual feature vectors obtained to support the generation of a personalized prompt may include a current text vector generated based on the transcript of the ongoing communication, a prompt input vector which is created by combining a personalized contextual vector and a geo-localized contextual vector. In some embodiments, the personalized contextual vector may represent the personal characteristics of the customer in both prior and present communications, such as intent exhibited at different levels, emotions detected, any unanswered questions, or unresolved issues. The geo-localized contextual vector may represent characteristics of geo-locale dependent communications. For example, a geo-localized contextual vector associated with a geo-locale may reveal a range of topics in communications along with a ranking as to relative occurring frequencies.

Such textual feature vectors may provide the basis for generating a personalized prompt because the personalized contextual vector may describe the personal traits or preferences in terms of communication style, temperament, etc., which can be relevant in terms of how to generate a next prompt. When the personalized contextual vector is derived based on both historic and present communications, the captured personal traits and temperament may reflect both general (in all communications) and specific (in ongoing communication) features that may influence the prompt to be generated. The geo-localized contextual vector may provide another dimension of relevance in terms of personalization as it may provide an association between a geo-locale that the customer is presently in and some likely topics that the customer may be interested in exploring during the communication. For example, a geo-localized contextual vector for a specific geo-locale such as a local airport may capture that most of the communications that occurred at the local airport are related to requesting international coverage of phone services at some particular destination (placeholder) and during a specified time period (placeholder). Such captured information may provide guidance in terms of what is the next prompt to a customer presently calling at the local airport.

Figure 2A:
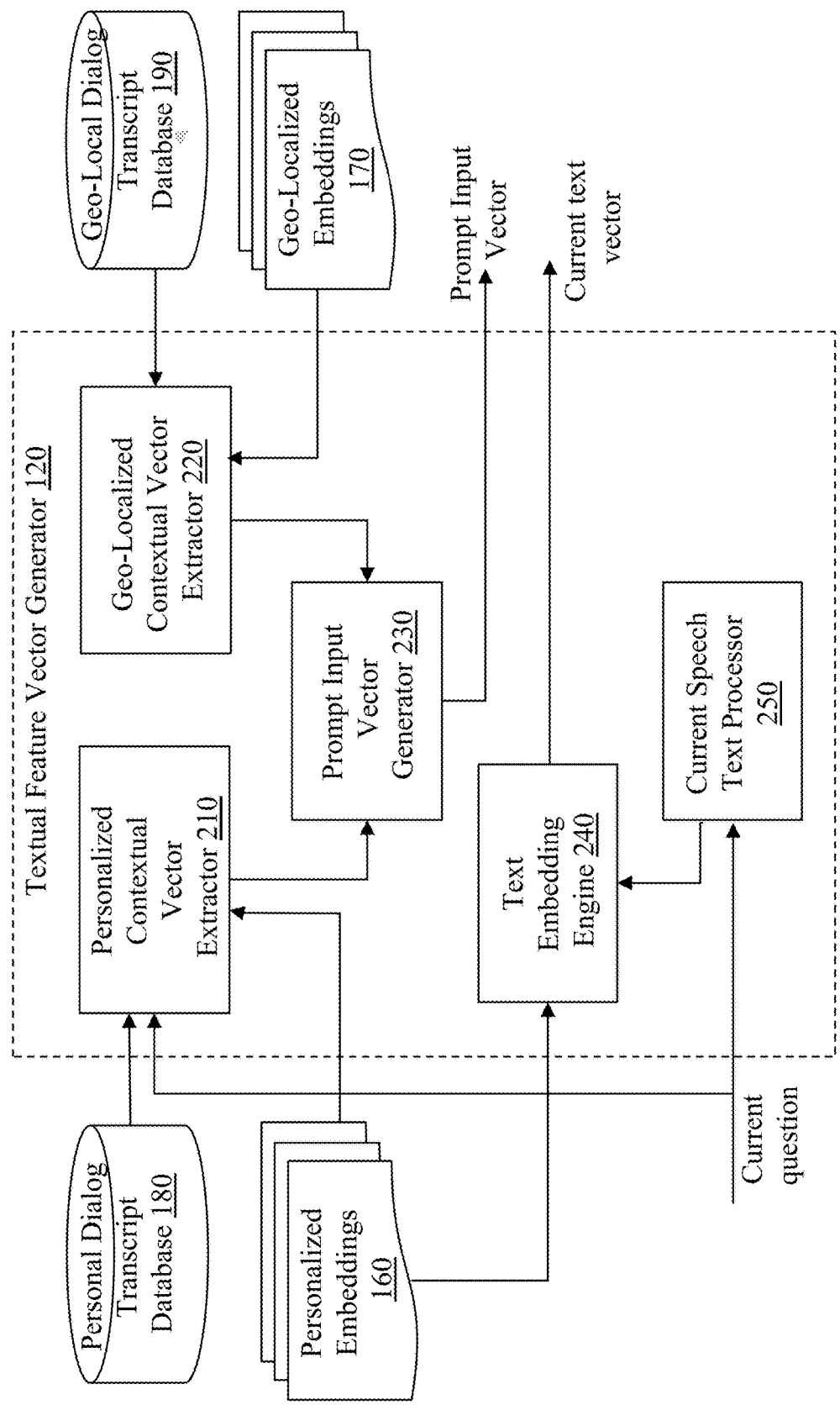
FIG. 2A depicts an exemplary high level system diagram of a textual feature vector generator, in accordance with an embodiment of the present teaching.

FIG. 2A depicts an exemplary high level system diagram of the textual feature vector generator 120, in accordance with an embodiment of the present teaching. As discussed herein, the textual feature vector generator 120 generates different feature vectors based on archived and ongoing transcripts in accordance with corresponding embeddings previously obtained via machine learning. Specifically, a personalized contextual vector may be obtained based on transcripts of historic and ongoing communications (archived in personal dialog transcript database 180) involving the customer currently in communication and derived using personalized embeddings 160. A geo-localized contextual vector may be obtained based on transcripts of historic communications occurred at a geo-locale that the customer 100 is currently present and derived using geo-localized embeddings 170. A current text embedding is obtained based on some questions, if any, from the ongoing communication. The textual feature vector generator 120 is constructed to reflect such relationships, as shown in FIG. 2A.

The textual feature vector generator 120 comprises a personalized contextual vector extractor 210, a geo-localized contextual vector extractor 220, a prompt input vector generator 230, a text embedding engine 240, and a current speech text processor 250. The personalized contextual vector extractor 210 is provided for obtaining a personalized contextual vector based on both historic and present communications of the customer, while the geo-localized contextual vector extractor 220 is provided for obtaining a geo-localized contextual vector based on transcripts of historic communications associated with a geo-location of the customer. The prompt input vector generator 230 is provided for combining a personalized contextual vector for a customer with a geo-localized contextual vector for a geo-locale of the customer to generate a prompt input vector. To obtain a current text embedding for a question in the ongoing communication, the current speech text processor 250 receives a current question pending in the present communication and sends the processed result to the text embedding engine 240, which obtains a current text embedding representing the current pending question. As discussed herein, both the prompt input vector and the current text embedding may form the basis for the dynamic prompt generator 130 to generate the next personalized prompt.

Figure 2B:
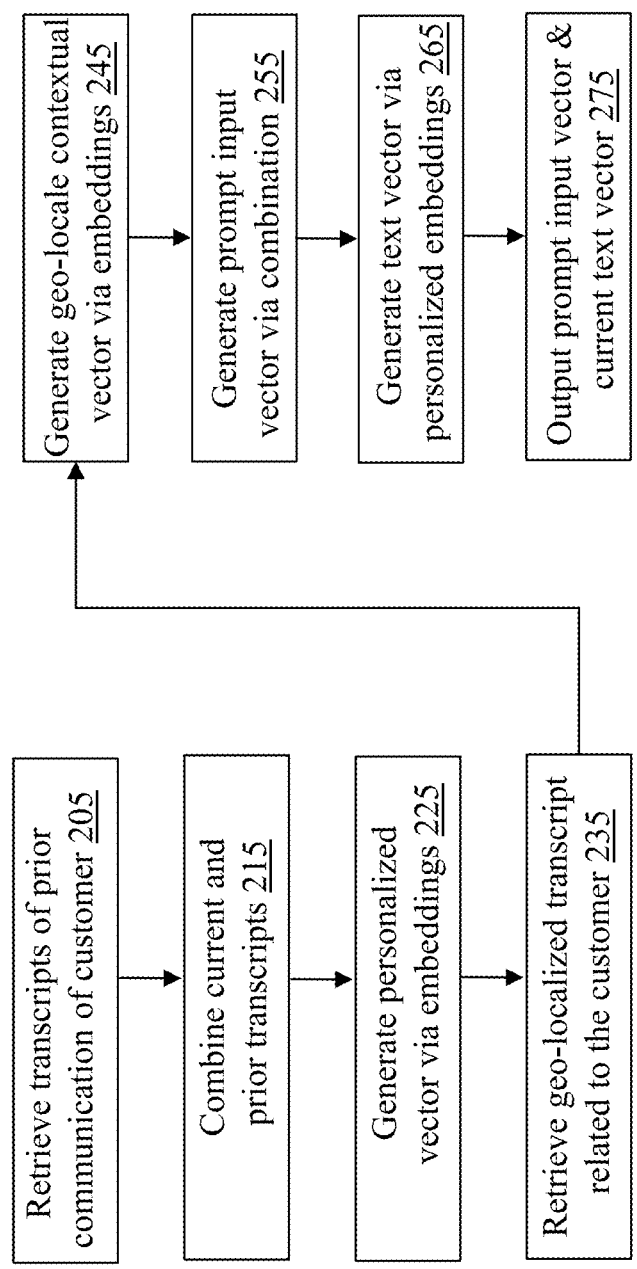
FIG. 2B is a flowchart of an exemplary process of a textual feature vector generator, in accordance with an embodiment of the present teaching.

FIG. 2B is a flowchart of an exemplary process of the textual feature vector generator 120, in accordance with an embodiment of the present teaching. In operation, the personalized contextual vector extractor 210 retrieves, at 205, transcripts of prior communications involving customer 100 from database 180 and combines, at 215, with the transcript of the current communication with customer 100. Based on the combined transcripts of both prior and current personal communications, a personalized contextual vector for customer 100 is generated, at 225, based on the personalized embeddings 160. The geo-localized contextual vector extractor 220 retrieves, at 235, transcripts of prior communications occurred at the geo-locale of customer 100 from database 190 and generates, at 245, a geo-localized contextual vector directed to the geo-locale of the customer. The prompt input vector generator 230 receives the personalized contextual vector and the geo-localized contextual vector and generates, at 255, a prompt input vector based on a combination of the two vectors. To generate a current text vector, the current speech text processor 250 processes the transcript of the current communication to identify pending question(s) and the text embedding engine 240 generates, at 265, a current text vector using the personalized embeddings 160. Such generated prompt input vector and the current text vector are then output at 275 to the dynamic prompt generator 130.

Figure 3A:
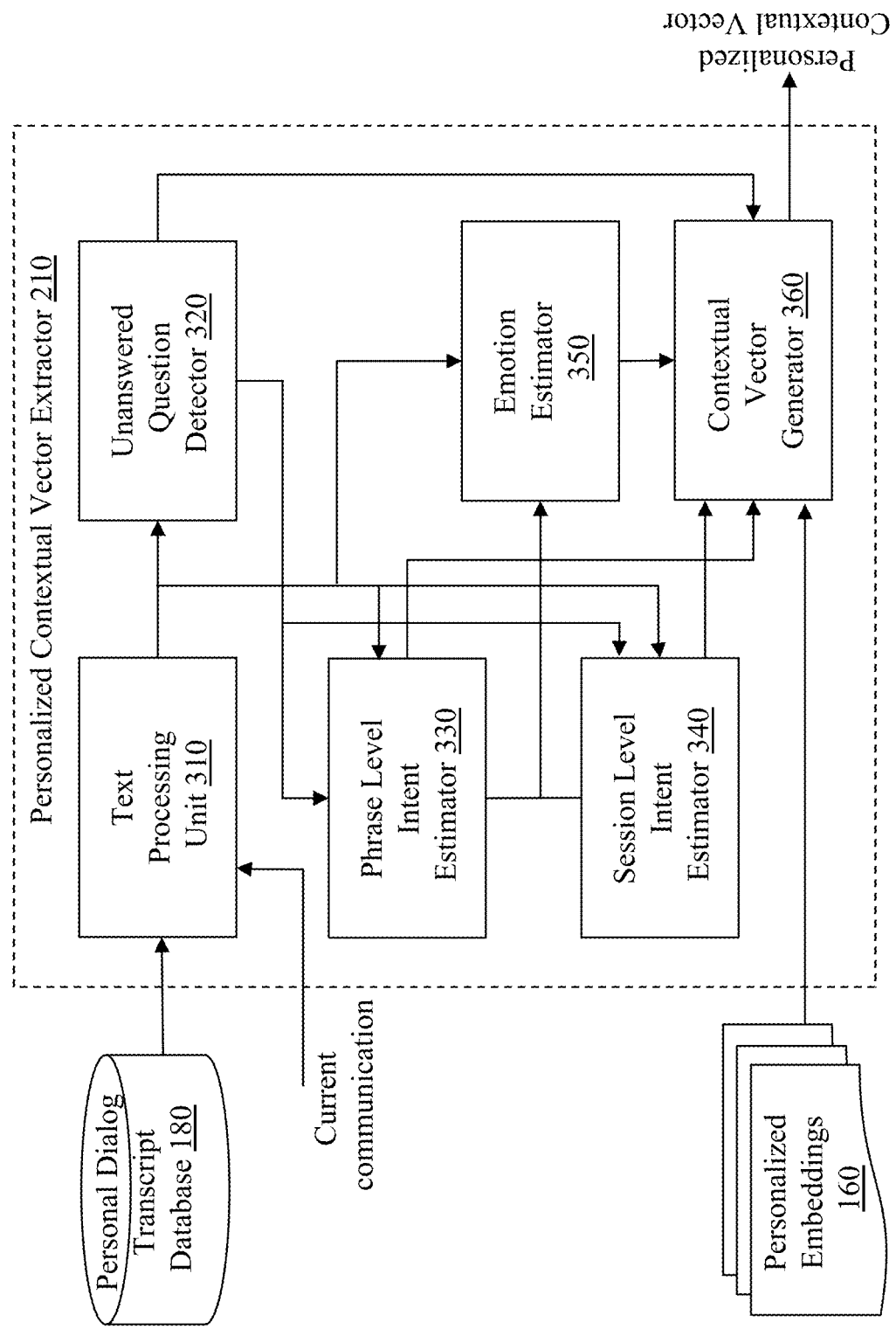
FIG. 3A depicts an exemplary high level system diagram of a personalized contextual vector extractor, in accordance with an embodiment of the present teaching.

As seen in FIG. 2A, a personalized contextual vector and a geo-localized contextual vector for the same communication are separately obtained based on transcripts of different communications using different sets of embeddings. In some embodiments, the specific features captured by these vectors may also differ. Details relating to how to extraction of a personalized contextual vector and a geo-localized contextual vector are provided herein with references to FIGS. 3A-4B. FIG. 3A depicts an exemplary high level system diagram of the personalized contextual vector extractor 210, in accordance with an embodiment of the present teaching. In some embodiments, the personalized contextual vector extractor 210 obtains a personalized contextual vector based on exemplary types of features, including intent at both phrase and session levels, emotional state of the customer, unanswered question(s) in the ongoing communication, etc. As discussed herein, an intent may be related to a topic or an issue that a customer intends to discuss.

In the system diagram illustrated in FIG. 3A, the personalized contextual vector extractor 210 comprises a text processing unit 310, an unanswered question detector 320, a phrase level intent estimator 330, a session level intent estimator 340, an emotion estimator 350, and a contextual vector generator 360. The text processing unit 310 is provided to retrieve transcripts of historic communications involving a customer and processes the retrieved transcripts to, e.g., extract phrases, session boundaries, or other linguistic features to be used in estimating different features. The text processing unit 310 may also receive the transcript of the ongoing communication for processing and the processed result may be sent to the unanswered question detector 320 to determine whether there are any unanswered questions in the ongoing communications. As discussed herein, the presence of an unanswered question in an ongoing communication may serve as a clue as to what the intent of the customer is.

Phrases extracted from the transcripts as well as any identified unanswered question in the ongoing communication may be input to the phrase level intention estimator 330 so that intent associated with relevant phrases may be estimated. Similarly, the processed text associated with sessions identified from retrieved transcripts as well as any identified unanswered question in the ongoing communication may be input to the session level intention estimator 340 so that intent associated with each communication session may be estimated. The estimated phrase and session level intent, together with the processed text information, may be provided to the emotion estimator 350 to predict the emotional state of the customer. These estimated features (intent at different levels and emotional state of the customer) may then be provided to the contextual vector generator 360, which may then generate a personalized contextual vector based on the input feature values in accordance with the personalized embeddings 160.

Figure 3B:
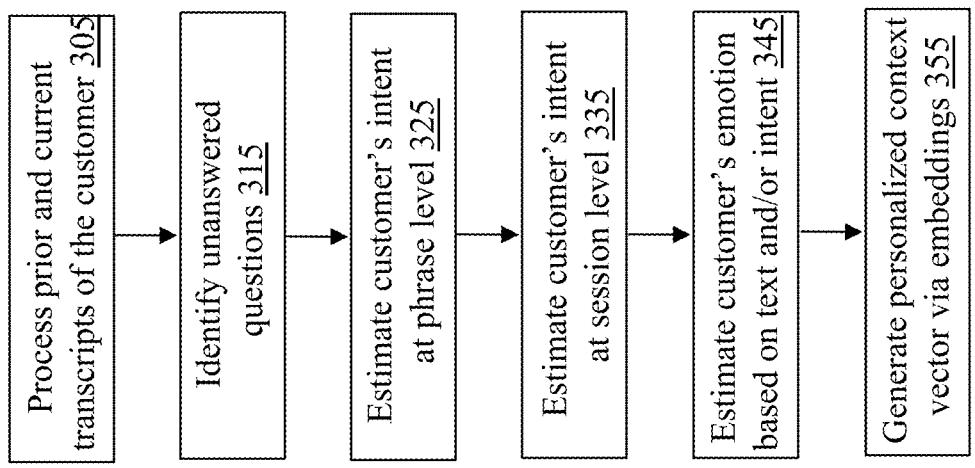
FIG. 3B is a flowchart of an exemplary process of a personalized contextual vector extractor, in accordance with an embodiment of the present teaching.

FIG. 3B is a flowchart of an exemplary process of the personalized contextual vector extractor 210, in accordance with an embodiment of the present teaching. In operation, when the text processing unit 310 retrieves transcripts associated with the customer (including both historic and ongoing communications), it may process, at 305, the text to, e.g., identify sessions, phrases within each session, and send the processed results to other processing units. Upon receiving the processed result from the text processing unit 310, the unanswered question detector 320 detects, at 315, unanswered questions and sends to the detected unanswered questions, if any, to the intent estimators 330 and 340. With extracted phrases from the text processing unit 310 and the unanswered questions from the unanswered question detector 320, the phrase level intent estimator 330 estimates, at 325, the customer's intent associated with relevant phrases. Similarly, with processed text for each session from the text processing unit 310 and the unanswered questions from the unanswered question detector 320, the session level intent estimator 330 estimates, at 325, the customer's intent for each communication session. Based on the estimated intent at different levels as well as the processed text from the text processing unit 310, the emotion estimator 350 estimates, at 345, the customer's emotional state. The estimated customer's intent at different levels as well as the estimated customer's emotional state may then be used by the contextual vector generator 360 to generate, at 355, a personalized contextual vector based on the personalized embeddings 160.

Figure 4A:
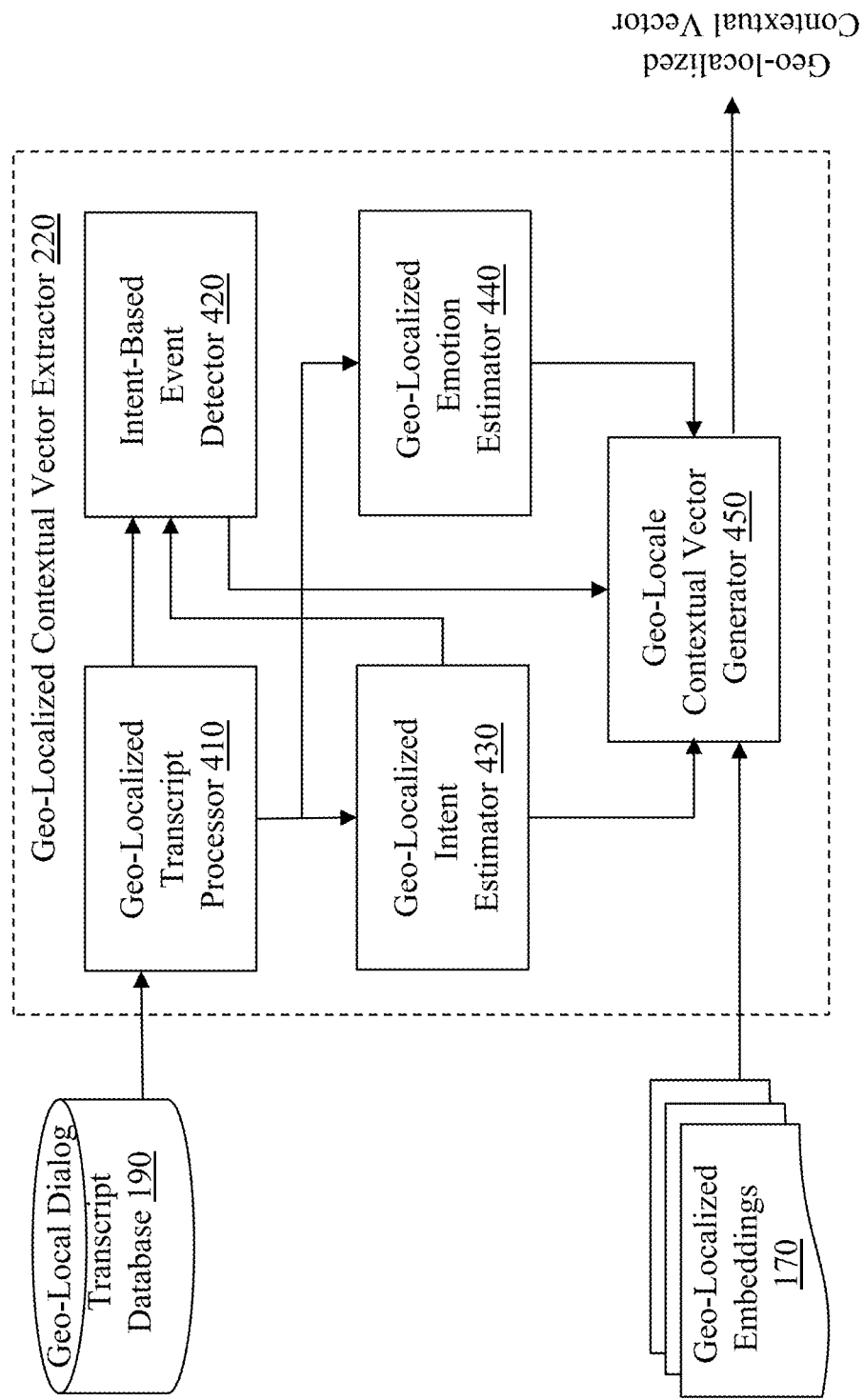
FIG. 4A depicts an exemplary high level system diagram of a geo-localized contextual vector extractor, in accordance with an embodiment of the present teaching.

FIG. 4A depicts an exemplary high level system diagram of the geo-localized contextual vector extractor 220, in accordance with an embodiment of the present teaching. As discussed herein, the present teaching considers the contextual information related to a geo-locale where a customer is engaged in a communication in order to generate prompts that are geo-locale aware and are likely appropriate in the context. The exemplary geo-localized contextual vector extractor 220 comprises a geo-localized transcript processor 410, a geo-localized intent estimator 430, a geo-localized emotion estimator 440, an intent-based event detector 420, and a geo-locale contextual vector generator 450.

The geo-localized transcript processor 410 is provided to retrieve and process transcripts of specific geo-locale related communications. The geo-localized intent estimator 430 is provided for estimating one or more intents associated with a geo-locale. More than one intent may be associated with a geo-locale. For instance, calls made at a local airport may frequently be intended for subscribing international coverage of phone service in a destination. It may also be common that calls made at a local airport are intended for canceling or terminating a subscribed international coverage. Calls from the same airport may also be intended for other issues such as checking billing statements or checking on an application status of an offered discount, etc. With each possible intent associated with a geo-locale, the number of events as occurred may be determined so that the detected intents associated with a geo-locale may be ranked, e.g., from the highest rank (with the highest occurrence rate) to the lowest (with the lowest occurrence rate). The intent-based event detector 420 may be provided to detect the event occurrence rate of each detected geo-localized intent and rank such intents according to the occurrence rates thereof.

The geo-localized emotion estimator 440 is provided for estimating the emotional state associated with a given geo-locale based on processed text information from transcripts associated with a geo-locale. For instance, from transcripts of geo-locale related communications, an emotional state associated with a sense of urgency (e.g., impatience, in a hurry) may be detected which may reflect some characteristic aspects of the communications at the geo-locale and may influence how the personalized IVR system controls the flow of a communication involving the geo-locale. Different features detected/estimated from geo-localized communications, including geo-localized intents, e.g., ranked according to occurrence rates and geo-localized emotions, may then be utilized by the geo-locale contextual vector generator 450 to generate a geo-localized contextual vector based on the geo-localized embeddings 170.

Figure 4B:
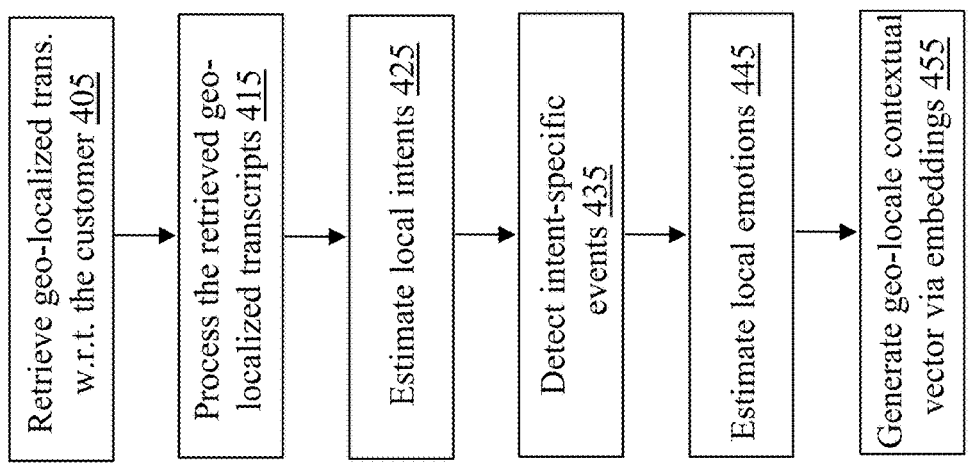
FIG. 4B is a flowchart of an exemplary process of a geo-localized contextual vector extractor, in accordance with an embodiment of the present teaching.

FIG. 4B is a flowchart of an exemplary process of the geo-localized contextual vector extractor 220, in accordance with an embodiment of the present teaching. Upon receiving information indicative of a geo-locale of a customer engaged in an on-going communication, the geo-localized transcript processor 410 retrieves, at 405, transcripts of communications associated with the geo-locale and processes, at 415, such transcripts. The processed text information is then sent to the geo-localized intent estimator 430, the intent-based event detector 420, and the geo-localized emotion estimator 440. Upon receiving the processed text information, the geo-localized intent estimator 430 estimates, at 425, one or more intents exhibited during communications associated with the geo-locale. The estimated intent(s) may be provided to the intent-based event detector 420 to detect, at 435, intent-specific events to determine an occurrence rate associated with each intent. The geo-localized emotion estimator 440 estimates, at 445, geo-localized emotional state based on contextual information derived from the processed text information. The geo-localized estimated intent(s), the intent-based event occurrence rates, as well as the estimated geo-localized emotion may be provided to the geo-locale contextual vector generator 450 and used to generate, 455, a geo-localized contextual vector based on the geo-localized embeddings 170.

As discussed herein, for an ongoing communication involving a customer and occurring at a geo-locale, two vectors are obtained. The first vector is a prompt input vector obtained by combining a personalized contextual vector representing personalized characterization of the customer (from both historic and present perspectives) and a geo-localized contextual vector capturing the characteristics of the geo-locale of the customer. The second vector is a current text vector obtained to characterize the customer's ongoing communication. These two vectors characterize different aspects of the ongoing communication (the customer, the geo-locale, and current conversation) to provide the basis for personalizing prompt generation. These two vectors are provided to the dynamic prompt generator 130 (see FIG. 1A) which generates a dynamic prompt personalized and geo-locale aware based on the characteristics captured in the input image.

Figure 5A:
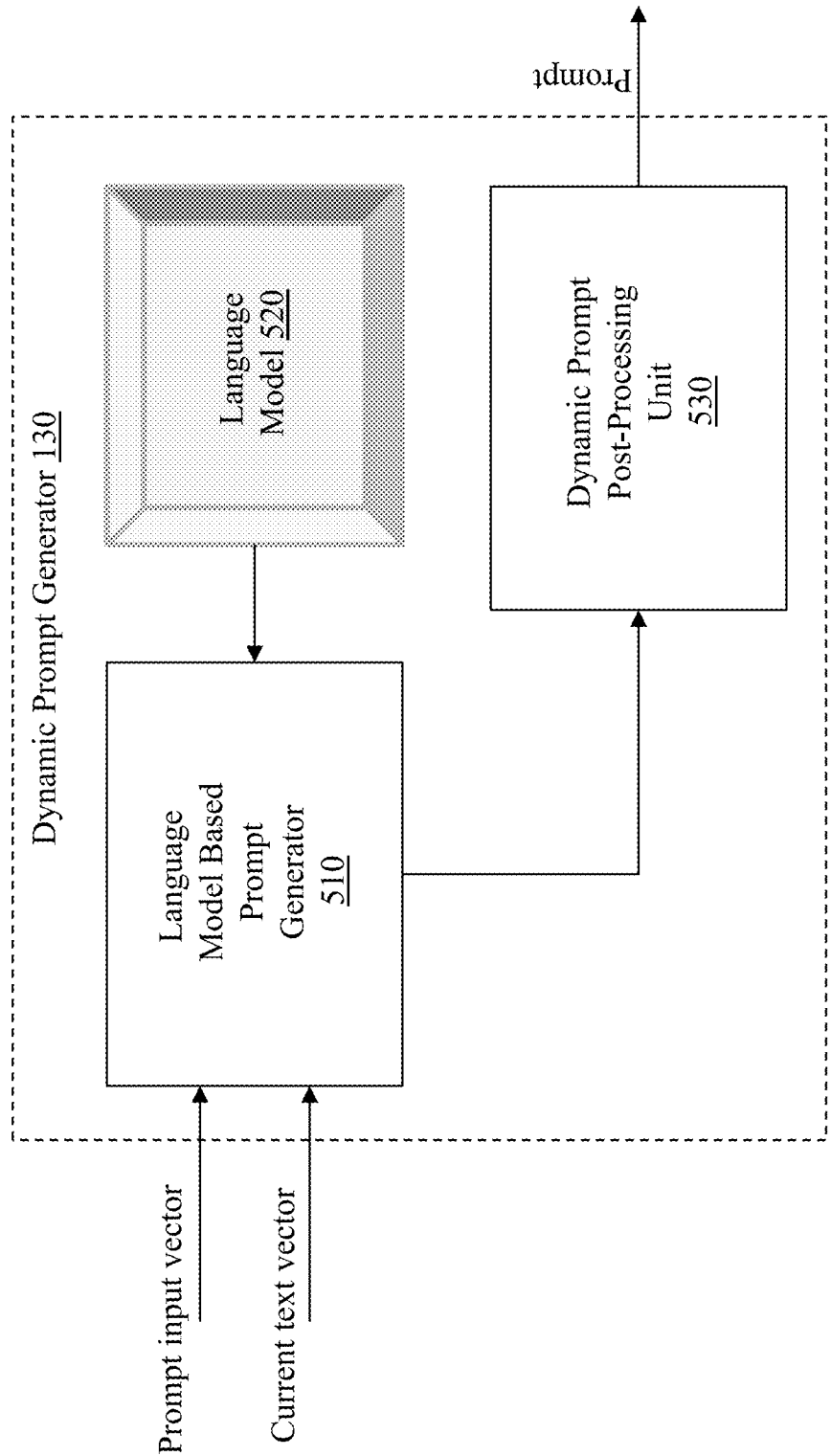
FIG. 5A depicts an exemplary high level system diagram of a dynamic prompt generator, in accordance with an embodiment of the present teaching.

FIG. 5A depicts an exemplary high level system diagram of the dynamic prompt generator 130, in accordance with an embodiment of the present teaching. As illustrated herein, the dynamic prompt generator 130 takes a prompt input vector and a current text vector as inputs and produces a prompt as an output. In this illustrated embodiment, the dynamic prompt generator 130 comprises a language model-based prompt generator 510, a language model 520, and a dynamic prompt post-processing unit 530. The language model-based prompt generator 510 may be provided for controlling the prompt generation based on the language model 520. The dynamic prompt post-processing unit 530 may be provided for takes a prompt generated by the language model 520 based on input vectors as input and produces, e.g., a well-formed prompt sentence as its output prompt.

As discussed herein, the language model 520 may be previously trained via machine learning. The language model 520 may be implemented using technologies either existing today or developed in the future. Existing technologies that may be deployed to implement the language model 520 may include different transformers or modeling approaches, including but is not limited to, generative pre-trained transformer (GPT), bidirectional encoder representations from transformers (BERT) and its variation (e.g., a lite BERT or ALBERT, decoding-enhanced BERT or DeBERT, robustly optimized BERT pretraining approach or RoBERT), transformer for extra-long strings (Transformer-XL), text-to-text transformer (T5), or pathway-based language modeling (PaLM). These exemplary language models may be trained to operate as a transformer to transform input into a linguistic word, phrase, or sentence as its output. Different language models may be pretrained using different approaches, including Pegasus that pretrains a model with extracted gap sentences for abstractive summarization sequence-to-sequence modeling, XLNet that pretrains via unsupervised language representation learning approach based on generalized permutation language modeling, or ELECTRA for efficiently learning an encoder for classifying token replacement accurately.

As discussed herein, the language model 520 may be previously trained to take input vectors and produce (transform into) a prompt in text form. In deployment, such a pretrained language model may operate as it is trained, i.e., taking input vectors representing different personalized and geo-locale aware characteristics as well as a current text vector representing the current conversation, and transforming the input vectors into a text string or a prompt. Due to pretraining, the language model 520 embodies the knowledge learned during training about the customer and the geo-locale so that it is able to produce prompts that are personalized with respect to the customer and geo-locale aware.

Figure 5B:
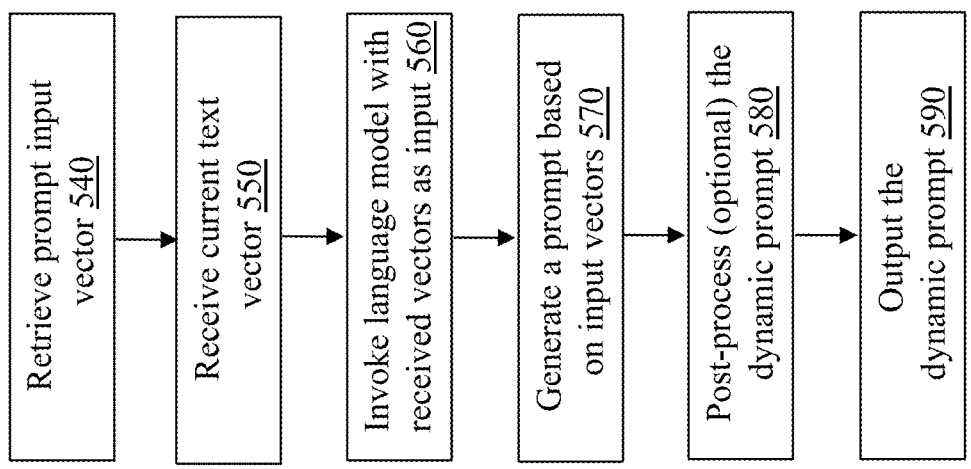
FIG. 5B is a flowchart of an exemplary process of a dynamic prompt generator, in accordance with an embodiment of the present teaching.

FIG. 5B is a flowchart of an exemplary process of the dynamic prompt generator 130, in accordance with an embodiment of the present teaching. When the language model-based prompt generator 510 receives a prompt input vector (at 540) and a current text vector (at 550), it invokes, at 560, the language model 520 with the received input vectors. The language model 520 receives the input vectors and generates, at 570, a prompt in text form, which may then be post-processed, at 580, by the dynamic prompt post-processing unit 530. Such post-processing may include, e.g., generating a properly formatted prompt based on the prompt output from the language model 520 and/or translating the prompt sentence into a language suitable for the customer.

As shown in FIG. 1A, the output of the dynamic prompt generator 130 is provided to the IVR communication generator 140 which may generate, based on the personalized prompt, a textual response for corresponding with the customer 100. In some situations, when the customer 100 and the personalized IVR system 110 are engaged in textual communication, the textual response may be used directly to respond to the customer. If the communication is conducted in voice, the TTS unit 150 may be invoked to convert the textual response into a voice signal to be conveyed to the customer.

Figure 6:
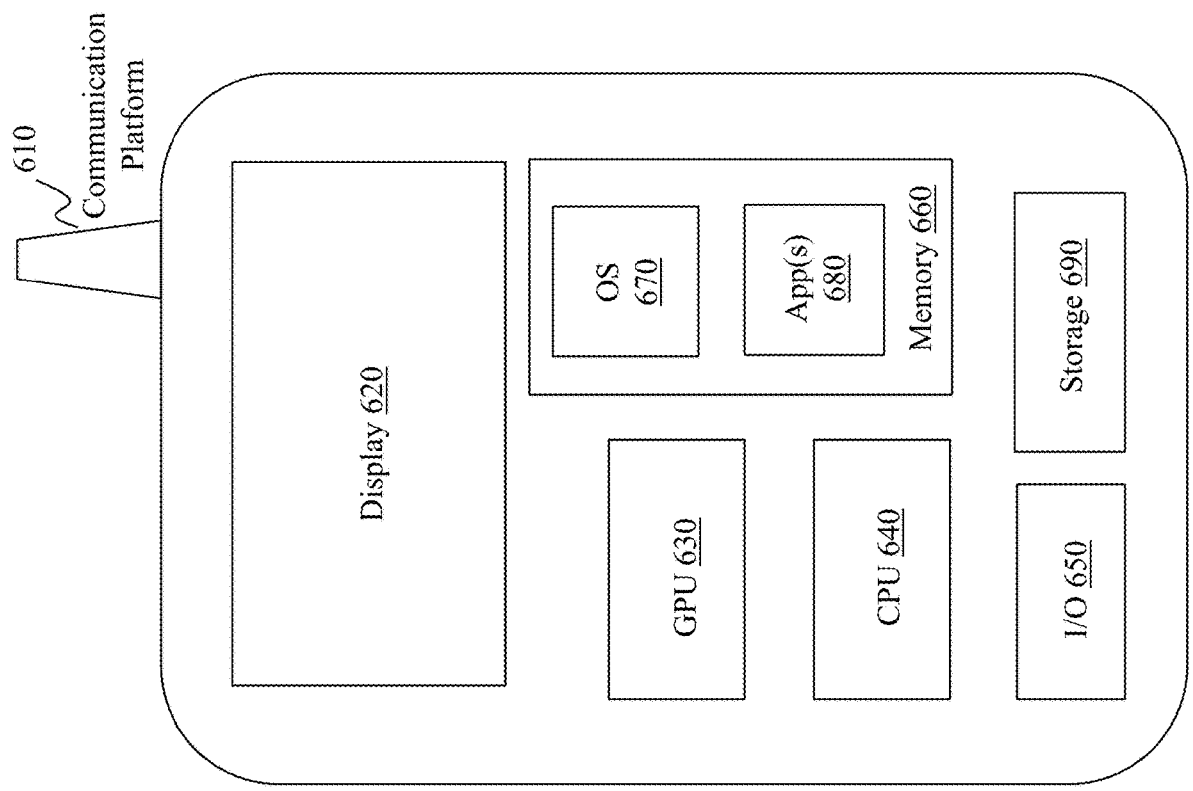
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or a mobile computational unit in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.) and one or more applications 680 may be loaded into memory 660 from storage 690 in order to be executed by the CPU 640. The applications 680 may include a user interface or any other suitable mobile apps for information exchange, analytics, and management according to the present teaching on, at least partially, the mobile device 600. User interactions, if any, may be achieved via the I/O devices 650 and provided to the various components thereto.

To implement various modules, units, and their functionalities as described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
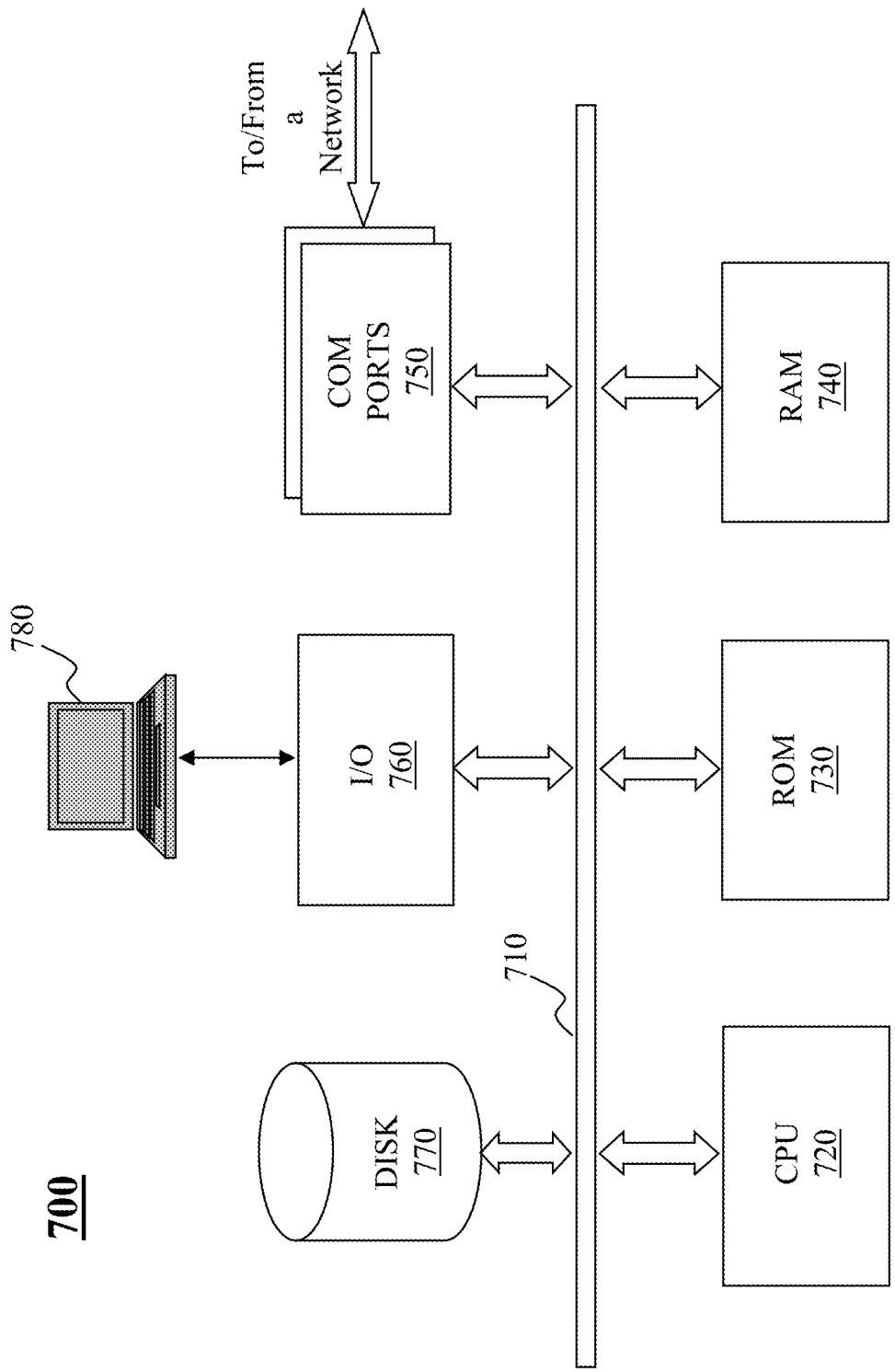
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 700 may be used to implement any component or aspect of the framework as disclosed herein. For example, the information processing and analytical method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is noted that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

In the preceding specification, various example embodiments have been described with reference to the accompanying drawings. It will, however, be evident that various modifications and changes may be made thereto, and additional embodiments may be implemented, without departing from the broader scope of the present teaching as set forth in the claims that follow. The specification and drawings are accordingly to be regarded in an illustrative rather than restrictive sense.

We claim:

1. A method, comprising:
   receiving a transcript of a current communication with a customer at a geo-locale;
   retrieving a first set of transcripts of historic communications associated with the customer and a second set of transcripts of historic communications that occurred at the geo-locale;
   computing a prompt input vector based on
   a personalized contextual vector obtained based on the transcript and the first set of transcripts, wherein the personalized contextual vector represents personal characteristics of the customer exhibited in the current and the historic communications,
   a geo-localized contextual vector obtained based on the second set of transcripts, wherein the geo-localized contextual vector represents characteristics of the geo-locale;
   computing a current text vector based on the transcript to characterize the current communication;
   generating, by a language model, a prompt based on the prompt input vector and the current text vector, wherein the language model is pretrained via deep learning to predict a next sentence in the current communication based on contexts of the current communication and historic communications captured by the current text vector and the prompt input vector, respectively, and wherein the language model learns, via training, to predict in different contexts;
   creating an interactive voice response (IVR) communication based on the prompt for responding to the customer; and
   sending the IVR communication to the customer.

2. The method of claim 1, wherein the computing the prompt input vector comprises:
   processing the transcript and the first set of transcripts to generate a first processed result;
   estimating a first plurality of features characterizing the customer based on the first processed result; and
   computing the personalized contextual vector based on the first plurality of features and personalized embeddings previously trained via machine learning.

3. The method of claim 2, wherein the first plurality of features include at least one of:
   a first level intent of the customer estimated based on each phrase identified in the first processed result;
   a second level intent of the customer estimated based on each session of communication transcript identified in the first processed result;
   an emotional state of the customer estimated based on at least one of the first level intent, the second level intent, and the first processed result; and
   at least one unanswered question detected from the first processed result.

4. The method of claim 2, further comprising:
   processing the second set of transcripts to generate a second processed result;
   estimating a second plurality of features characterizing the geo-locale based on the second processed result;
   computing the geo-localized contextual vector based on the second plurality of features and geo-localized embeddings previously trained via machine learning;
   generating the prompt input vector by combining the personalized contextual vector and the geo-localized contextual vector.

5. The method of claim 4, wherein the second plurality of features include at least one of:
   at least one geo-localized intent estimated with respect to the geo-locale based on the second processed result;
   at least one intent-based event level detected based on the second processed result, wherein each of the at least one intent-based event level characterizes a corresponding one of the at least one geo-localized intent; and
   an emotional state associated with the geo-locale estimated based on the second processed result.

6. The method of claim 1, wherein the creating an interactive voice response (IVR) communication based on the prompt comprises:
   generating an IVR communication in a textual form based on the prompt;
   converting the IVR communication in the textual form into a voice signal based on text-to-speech transformation; and
   outputting the voice signal as the IVR communication.

7. A machine readable and non-transitory medium having information recorded thereon, wherein the information, when read by the machine, causes the machine to perform the following steps:
   receiving a transcript of a current communication with a customer at a geo-locale;
   retrieving a first set of transcripts of historic communications associated with the customer and a second set of transcripts of historic communications occurred at the geo-locale;
   computing a prompt input vector based on
   a personalized contextual vector obtained based on the transcript and the first set of transcripts, wherein the personalized contextual vector represents personal characteristics of the customer exhibited in the current and the historic communications,
   a geo-localized contextual vector obtained based on the second set of transcripts, wherein the geo-localized contextual vector represents characteristics of the geo-locale;
   computing a current text vector based on the transcript to characterize the current communication;
   generating, by a language model, a prompt based on the prompt input vector and the current text vector, wherein the language model is pretrained via deep learning to predict a next sentence in the current communication based on contexts of the current communication and historic communications captured by the current text vector and the prompt input vector, respectively, and wherein the language model learns, via training, to predict in different contexts;
   creating an interactive voice response (IVR) communication based on the prompt for responding to the customer; and sending the IVR communication to the customer.

8. The medium of claim 7, wherein the computing the prompt input vector comprises:
processing the transcript and the first set of transcripts to generate a first processed result;
estimating a first plurality of features characterizing the customer based on the first processed result; and
computing the personalized contextual vector based on the first plurality of features and personalized embeddings previously trained via machine learning.

9. The medium of claim 8, wherein the first plurality of features include at least one of:
a first level intent of the customer estimated based on each phrase identified in the first processed result;
a second level intent of the customer estimated based on each session of communication transcript identified in the first processed result;
an emotional state of the customer estimated based on at least one of the first level intent, the second level intent, and the first processed result; and
at least one unanswered question detected from the first processed result.

10. The medium of claim 8, wherein the information, once read by the machine, further causes the machine to perform:
processing the second set of transcripts to generate a second processed result;
estimating a second plurality of features characterizing the geo-locale based on the second processed result;
computing the geo-localized contextual vector based on the second plurality of features and geo-localized embeddings previously trained via machine learning;
generating the prompt input vector by combining the personalized contextual vector and the geo-localized contextual vector.

11. The medium of claim 10, wherein the second plurality of features include at least one of:
at least one geo-localized intent estimated with respect to the geo-locale based on the second processed result;
at least one intent-based event level detected based on the second processed result, wherein each of the at least one intent-based event level characterizes a corresponding one of the at least one geo-localized intent; and
an emotional state associated with the geo-locale estimated based on the second processed result.

12. The medium of claim 7, wherein the creating an interactive voice response (IVR) communication based on the prompt comprises:
generating an IVR communication in a textual form based on the prompt;
converting the IVR communication in the textual form into a voice signal based on text-to-speech transformation; and
outputting the voice signal as the IVR communication.

13. A system, comprising:
a textual feature vector generator implemented by a processor and configured for
receiving a transcript of a current communication with a customer at a geo-locale,
retrieving a first set of transcripts of historic communications associated with the customer and a second set of transcripts of historic communications occurred at the geo-locale,
computing a prompt input vector based on
a personalized contextual vector obtained based on the transcript and the first set of transcripts, wherein the personalized contextual vector represents personal characteristics of the customer exhibited in the current and the historic communications, and
a geo-localized contextual vector obtained based on the second set of transcripts, wherein the geo-localized contextual vector represents characteristics of the geo-locale, and
computing a current text vector based on the transcript to characterize the current communication;
a dynamic prompt generator implemented by a processor and configured for generating, by a language model, a prompt based on the prompt input vector and the current text vector, wherein the language model is pretrained via deep learning to predict a next sentence in the current communication based on contexts of the current communication and historic communications captured by the current text vector and the prompt input vector, respectively, and wherein the language model learns, via training, to predict in different contexts; and
an IVR communication generator implemented by a processor and configured for
creating an interactive voice response (IVR) communication based on the prompt for responding to the customer, and
sending the IVR communication to the customer.

14. The system of claim 13, wherein the computing the prompt input vector comprises:
processing the transcript and the first set of transcripts to generate a first processed result;
estimating a first plurality of features characterizing the customer based on the first processed result; and
computing the personalized contextual vector based on the first plurality of features and personalized embeddings previously trained via machine learning.

15. The system of claim 14, wherein the first plurality of features include at least one of:
a first level intent of the customer estimated based on each phrase identified in the first processed result;
a second level intent of the customer estimated based on each session of communication transcript identified in the first processed result;
an emotional state of the customer estimated based on at least one of the first level intent, the second level intent, and the first processed result; and
at least one unanswered question detected from the first processed result.

16. The system of claim 14, wherein the computing the prompt input vector further comprising:
processing the second set of transcripts to generate a second processed result;
estimating a second plurality of features characterizing the geo-locale based on the second processed result;
computing the geo-localized contextual vector based on the second plurality of features and geo-localized embeddings previously trained via machine learning;
generating the prompt input vector by combining the personalized contextual vector and the geo-localized contextual vector.

17. The system of claim 16, wherein the second plurality of features include at least one of:
at least one geo-localized intent estimated with respect to the geo-locale based on the second processed result;
at least one intent-based event level detected based on the second processed result, wherein each of the at least one intent-based event level characterizes a corresponding one of the at least one geo-localized intent; and an emotional state associated with the geo-locale estimated based on the second processed result.

18. The system of claim 13, wherein the creating an interactive voice response (IVR) communication based on the prompt comprises:
   generating an IVR communication in a textual form based on the prompt;
   converting the IVR communication in the textual form into a voice signal based on text-to-speech transformation; and
   outputting the voice signal as the IVR communication.

* * * * *